United States Patent [19]

Ito et al.

[11] Patent Number: 4,847,756
[45] Date of Patent: Jul. 11, 1989

[54] DATA TRANSMISSION SYSTEM FOR A COMPUTER CONTROLLED COPYING MACHINE HAVING MASTER AND SLAVE CPU'S

[75] Inventors: Masazumi Ito, Toyohashi; Kenji Shibazaki, Aichi, both of Japan

[73] Assignee: Minolta Camera Kabushiki Kaisha, Osaka, Japan

[21] Appl. No.: 62,562

[22] Filed: Jun. 12, 1987

Related U.S. Application Data

[63] Continuation of Ser. No. 569,953, Jan. 11, 1984, abandoned.

[30] Foreign Application Priority Data

Jan. 11, 1983 [JP] Japan .................................. 58-3040

[51] Int. Cl.$^4$ ............................................. G06F 13/42
[52] U.S. Cl. ..................................... 364/200; 370/85; 355/202; 364/229.2; 364/230.4; 364/260.1; 364/525
[58] Field of Search ... 364/200 MS File, 900 MS File, 364/131, 132; 355/14 C; 370/85, 94, 95; 340/825.06, 825.07, 825.08

[56] References Cited

U.S. PATENT DOCUMENTS

| | | | |
|---|---|---|---|
| 3,310,782 | 3/1967 | Sinn et al. | 364/900 |
| 3,340,516 | 4/1965 | Harbour, Jr. et al. | 364/900 |
| 3,810,114 | 5/1974 | Yamada et al. | 364/200 |
| 4,124,887 | 11/1978 | Johnson et al. | 364/200 |
| 4,128,883 | 12/1978 | Duke et al. | 364/200 |
| 4,161,786 | 7/1979 | Hopkins et al. | 370/45 X |
| 4,170,791 | 10/1979 | Daughton et al. | 364/900 |
| 4,188,668 | 2/1980 | Finlay | 364/900 |
| 4,209,840 | 6/1980 | Benardi et al. | 364/200 |
| 4,219,873 | 8/1980 | Kober et al. | 364/200 |
| 4,241,398 | 12/1980 | Carll | 370/94 X |
| 4,304,001 | 12/1981 | Cope | 364/132 |
| 4,314,334 | 2/1982 | Daughton et al. | 355/14 C |
| 4,365,297 | 12/1982 | Grisham, Jr. | 364/200 |
| 4,368,514 | 1/1983 | Persaud et al. | 364/200 |
| 4,413,341 | 11/1983 | Markhasin et al. | 364/900 |
| 4,417,336 | 11/1983 | Weilbacker | 364/900 |
| 4,556,310 | 12/1985 | Masuda | 364/200 |

FOREIGN PATENT DOCUMENTS 57-64749 4/1982 Japan .

Primary Examiner—Raulfe B. Zache
Assistant Examiner—Florin Munteanu
Attorney, Agent, or Firm—Price, Gess & Ubell

[57] ABSTRACT

A data transmission system includes a host CPU having an output terminal for repeatedly producing a predetermined number of data blocks in a predetermined sequence in a repeated manner. Each data block is defined by a sequence code for identifying each data block and specific data followed by the sequence code. A plurality of slave CPUs are provided. The host CPU is connected to each slave CPU through a bus structure for the mutual data transmission. Each slave CPU receives all the data blocks and selectively extracts only the necessary data for use in each slave CPU and produces data from its output terminal at a given period within one cycle of the predetermined sequence. The given period for one slave CPU differs from that of another slave CPU, thereby transmitting data to the host CPU without any interferences.

9 Claims, 5 Drawing Sheets

DATA TRANSMISSION SYSTEM FOR A COMPUTER CONTROLLED COPYING MACHINE HAVING MASTER AND SLAVE CPU'S

This is a continuation application Ser. No. 569,953, filed on Jan. 11, 1984 now abandoned.

BACKGROUND OF THE INVENTION

1. Field of the invention

The present invention relates to a data transmission system for transmitting data among host CPU (central processing unit) and various slave, or object, CPUs.

2. Description of the Prior Art

Nowadays, machines have become sophisticated and are controlled by not only one microcomputer but by a plurality of microcomputers, called slave microcomputers, for controlling various different operations. For controlling the overall operation of the machine in a predetermined timed relationship, a host microcomputer is connected to the slave microcomputers. The host microcomputer and slave microcomputers define a total control system for controlling the machine operation.

Each of the slave microcomputers and host microcomputers can be defined by a CPU and other elements, such as a memory and an input/output (I/O) section. These elements, including the CPU, defining a microcomputer can be included on a single semiconductor chip and, therefore, no external data line is needed to transfer data within one chip of microcomputer. But, when a host microcomputer and slave microcomputers are employed in a single machine, data must be transferred among these microcomputers, and for this purpose, external data lines must be extended between the host microcomputer and each slave microcomputer, resulting in many data lines, the number of which is equal to the number of slave microcomputers employed. Furthermore, when it is required to add a slave microcomputer, such as when an optional device is to be added to the machine to upgrade the machine, it is very difficult to change the data transmission system. In other words, once the data lines are extended and programming for the data transmission is well organized, it is very difficult to add one or more slave microcomputers to the established control system. The reason being that it is necessary to increase the number of input/output ports in the host microcomputer for the additional slave microcomputer and to add another data line extending between the host and the newly added slave microcomputer. Furthermore, the programming for the old data transmission must be changed to accomodate the new slave microcomputer.

An approach has been made to improve the above described data transmission system between a host microcomputer and slave microcomputers, and is disclosed, e.g., in Tokkaisho (Japanese Patent Laid-open Publication) No. 57-64749 published Apr. 20, 1982. According to Takkaisho No. 57-64749, one data bus structure extends from the host microcomputer, and slave microcomputers are connected to the data bus structure through respective branch lines. Futhermore, a plurality of pairs of lines are needed, each pair extending between the host microcomputer and one slave microcomputer. Therefore, the data transmission system of Tokkaisho No. 57-64749 has one data bus structure with a number of branches equal to the number of slave microcomputers, and a number of pairs of lines also equal to the number of slave microcomputers. The data transmission system of Tokkaisho No. 57-64749 operates as follows.

The host microcomputer produces a request signal REQO which is sent through one line of a particular pair of lines extending between the host microcomputer and a designated object slave microcomputer, thereby transmitting the request signal REQO to the designated object slave microcomputer. Upon receipt of the request signal REQO, the object slave microcomputer enables its I/O section and, at the same time, sets its data DATA-A to its I/O register. When this is done, the object slave microcomputer produces a response signal REQE which is sent back to the host microcomputer through the other line of the particular pair of lines between the host and object slave microcomputers. Then, upon receipt of the response signal REQE, the host microcomputer sends out its data DATA-B through the bus structure to every one of the slave microcomputers, but only the object slave microcomputer accepts it. Furthermore, during, or after, the receipt of the data DATA-B from the host microcomputer, the object slave microcomputer sends out its data DATA-A through the bus structure to the host microcomputer, thereby completing a data exchange between the host and designated slave microcomputer.

Although the data transmission system according to Tokkaisho No. 57-64749 has reduced the number of data lines by the employment of a single data bus structure, it still requires a number of pairs of lines extending between the host and each of the slave microcomputers for the exchange of request and response signals. Therefore, when it is required to add another slave microcomputer, it is not only necessary to add another pair of lines, but it is also necessary to increase the number of I/O ports in the host microcomputer for the connection of another pair of lines. Furthermore, programming in the host microcomputer must be changed for enabling the designation of the newly added slave microcomputer.

SUMMARY OF THE INVENTION

The present invention has been developed with a view to substantially solving the above described disadvantages and has for its essential object to provide an improved data transmission system which has one data bus structure extending from the host microcomputer with the slave microcomputers connected to the data bus structure through respective branches, and having no other lines connected between any microcomputers.

It is also an essential object of the present invention to provide a data transmission system of the above described type which can add slave microcomputers without any difficulties.

It is a further object of the present invention to provide a data transmission system of the above described type which can readily be manufactured at low cost.

In accomplishing these and other objects, a data transmission system according to the present invention includes a host CPU (microcomputer) having an output terminal for repeatedly producing a predetermined number of data blocks in a predetermined sequence in a repeated manner. Each data block is defined by a sequence code for identifying each data block and specific data followed by the sequence code. The host CPU also has an input terminal. A bus structure has a first line extending from the output terminal of the host CPU for transmitting the data block, and a second line extending from the input terminal of the host CPU. A plurality of slave CPUs (microcomputers), the number of which is equal to or less than the number of data blocks, are provided. Each slave CPU has an input terminal connected to the first line of the bus structure for receiving the data blocks, and an output terminal connected to the second line of the bus structure for sending data from the slave CPU to the host CPU. The slave CPU selectively extracts necessary data from the data blocks for use in each slave CPU, and produces the data from its output terminal at a given period within one cycle of the predetermined sequence. The given period for one slave CPU is different from that of other slave CPU, thereby transmitting the data to the host CPU without any interferences.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENT

Although the data transmission system according to the present invention is applicable to any sophisticated machine having a control system defined by at least one host microcomputer and a plurality of slave microcomputers, the description hereinbelow is given in connection with a copying machine as an example of such a sophisticated machine.

Figure 1:
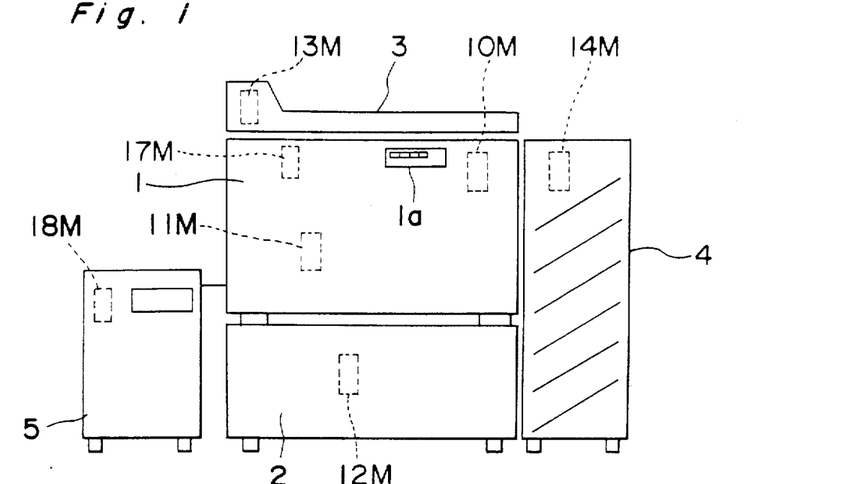
FIG. 1 is a diagrammatic view showing a host microcomputer and a number of slave microcomputers employed in a copying machine.

Referring to FIG. 1, a copy machine 1 has a copying system (not shown) including an optical arrangement (not shown) for forming an optical image of an object and a photosensitive surface (not shown) on which the image of the object is transferred to a copy paper in a known manner. Besides that, the copying machine further has various devices, such as paper feeding unit 2, document feeding device 3, sorter device 4, copy paper number and kind of trouble (paper jam etc.) display device 1a, display and memory unit 5, and so on. Since the operation of each device has many different steps, or many alternative steps, one microcomputer is provided for controlling the operation of one device. According to one embodiment, a master microcomputer 11M is provided for controlling the copying operation of the copying system, and subsidiary microcomputers 12M, 13M, 14M, 17M and 18M are provided respectively for controlling paper feeding unit 2, document feeding device 3, sorter device 4, display device 1a, and display and memory unit 5. It is to be noted that other subsidiary microcomputers may be provided for controlling other devices, such as a enlargement/reduction rate setting device (not shown) and a paper size setting device (not shown). But for the sake of brevity, the description hereinbelow is understood such that the copying machine shown in FIG. 1 is equipped with only a printing device, paper feeding unit 2, document feeding device 3, sorter device 4, display device 1a, and display and memory unit 5.

In addition to master microcomputer 11M and subsidiary microcomputers 12M, 13M, 14M, 17M and 18M, which are all referred to as slave microcomputers, the copying machine has a host microcomputer 10M which controls sequential operation in a predetermined timed relationship among slave microcomputers. Thus, the host microcomputer 10M governs the total system operation of the copying machine.

Each of the microcomputers 10M-14M, 17M and 18M is defined by CPU (central processing unit), memory, and I/O section, but since the data transmission between host and slave microcomputers is carried out actually between CPUs provided in the microcomputers, the description is focused on CPUs rather than on microcomputers. Therefore, the CPU of the host microcomputer 10M is referred to as a host CPU 10. This rule applies to the CPUs in other microcomputers.

Figure 2:
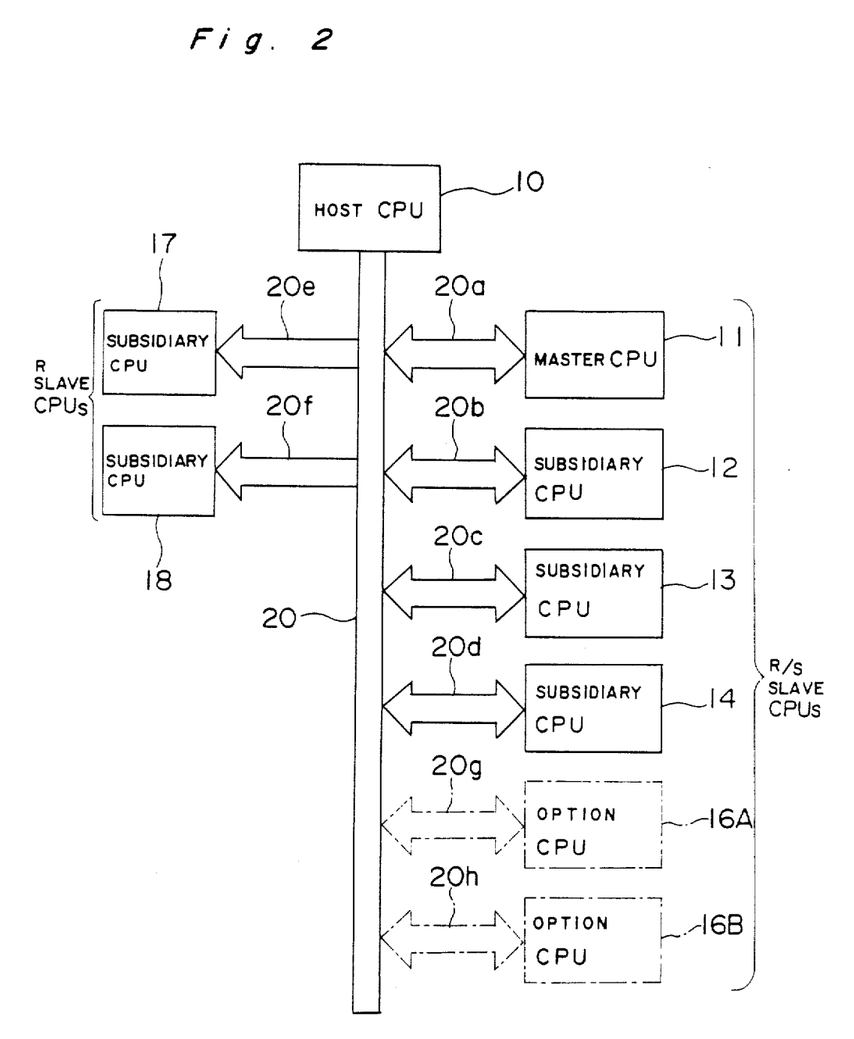
FIG. 2 is a block diagram showing a connection between a CPU of the host microcomputer and each of CPUs of slave microcomputers.

Referring to FIG. 2, a data transmission system according to the present invention is shown, which comprises a data bus structure 20 extending from the host CPU. The slave CPUs 11, 12, 13, 14, 17 and 18 are connected to the data bus structure 20 through respective branch lines 20a, 20b, 20c, 20d, 20e and 20f. As shown in FIG. 2, branch lines 20a, 20b, 20c and 20d are illustrated with arrows pointing opposite directions, while branch lines 20e and 20f are illustrated with an arrow pointing one direction towards slave CPU. These arrows indicate the direction of data flow. Therefore, it is understood that the slave CPUs 11, 12, 13 and 14 are capable of both receiving and sending data and, therefore, they are referred to as R/S slave CPUs, and that the CPUs 17 and 18 are capable of only receiving data and, therefore, they are referred to as R slave CPUs.

Figure 3:
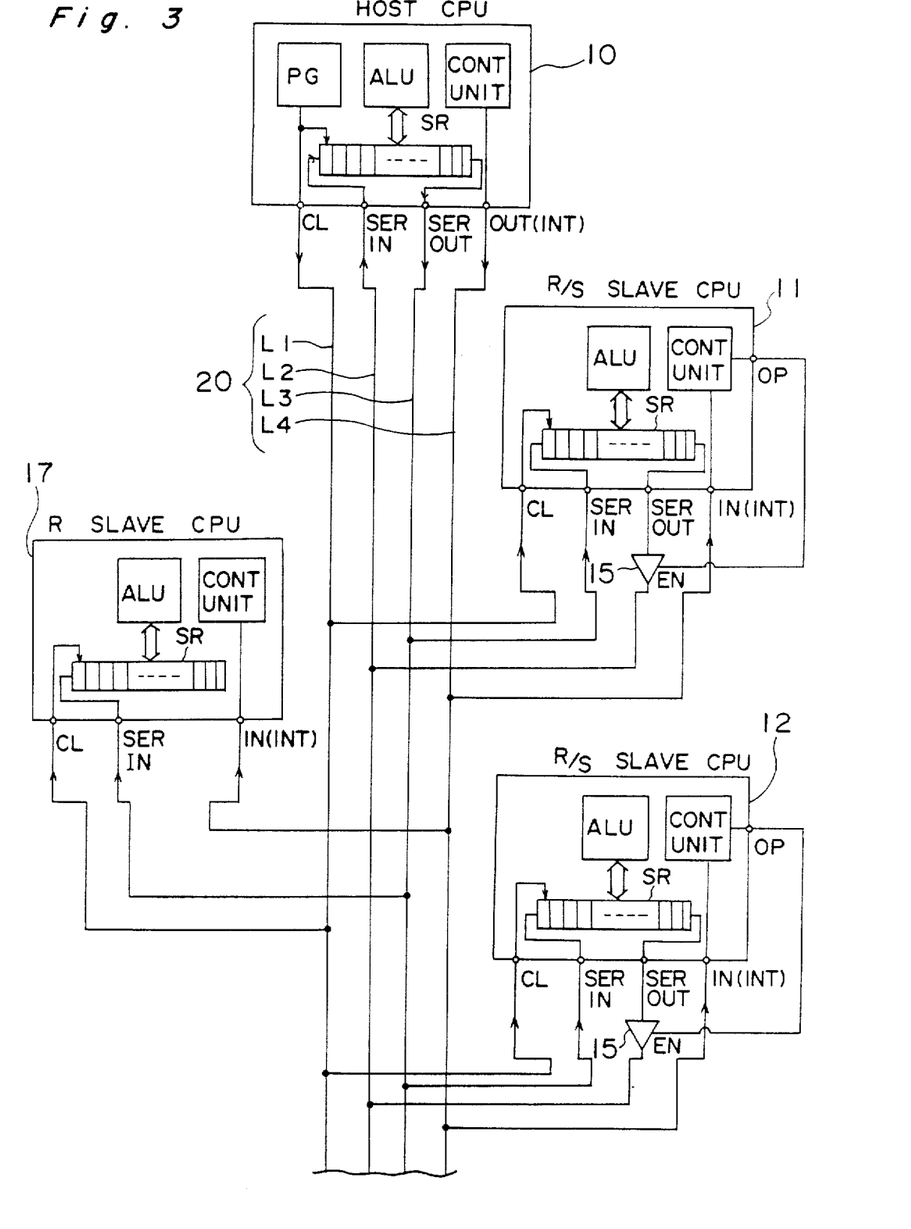
FIG. 3 is a circuit diagram showing a connection between a CPU of the host microcomputer and each of CPUs of slave microcomputers.

Referring now to FIG. 3, host CPU 10 has four terminals: clock terminal CL; serial-in terminal SER IN; serial-out terminal SER OUT; and interrupt request producing terminal OUT(INT), which four terminals are connected respectively to lines L1, L2, L3 and L4, defining the data bus structure 20. The host CPU includes a clock pulse generator PG for producing clock pulses which are applied to the clock terminal CL.

It is to be noted that clock pulse generator PG may be located externally of the host CPU. In this case, the host CPU may be further provided with an input terminal for receiving such clock pulses.

Still referring to FIG. 3, the host CPU further includes an arithmetic-logic unit ALU, a control unit CONT UNIT, and a 16-bit shift register SR. Arithmetic-logic unit ALU is connected to shift register SR through a bidirectional data path. An input end of the shift register SR is connected to serial-in terminal SER IN, and an output end thereof is connected to serial-out terminal SER OUT. Furthermore, shift register SR is connected to pulse generator PG, and is driven by the clock pulse. Control unit CONT UNIT produces interrupt requests which are transmitted through an interrupt request producing terminal OUT(INT).

Each of the R/S slave CPUs 11, 12, 13 and 14 has clock terminal CL, interrupt request receiving terminal IN(INT), serial-in terminal SER IN and serial-out terminal SER OUT. The clock terminal CL, interrupt request receiving terminal IN(INT) and serial-in terminal SER IN are directly connected to lines L1, L4 and L3, respectively, whereas serial-out terminal SER OUT is connected to line L2 through a gate 15. The R/S slave CPU further has an OP terminal which is connected to an enable terminal EN of gate 15. Like host CPU, R/S slave CPU includes an arithmetic-logic unit ALU, a control unit CONT UNIT, and a 16-bit shift register SR. Arithmetic-logic unit ALU is connected to shift register SR through a bidirectional data path. An input end of the shift register SR is connected to serial-in terminal SER IN, and an output end thereof is connected to serial-out terminal SER OUT. Furthermore, shift register SR is connected to clock terminal CL, and is driven in a synchronized manner with the shift register SR in the host CPU. Control unit CONT UNIT is connected to the interruption request receiving terminal IN(INT) and also to the OP terminal.

Each of the R slave CPUs 17 and 18 has a clock terminal CL, interrupt an request receiving terminal IN(INT) and serial-in terminal SER IN, which are directly connected to lines L1, L4 and L3, respectively. Like host CPU, R slave CPU includes an arithmetic-logic unit ALU, a control unit CONT UNIT, and a 16-bit shift register SR. Arithmetic-logic unit ALU is connected to shift register SR through a bidirectional data path. An input end of the shift register SR is connected to serial-in terminal SER IN, and an output end thereof is freed, so that the shift register SR in R slave CPU has no ability of sending out data serially. Furthermore, shift register SR is connected to clock terminal CL, and is driven in a synchronized manner with the shift register SR in the host CPU. Control unit CONT UNIT is connected to the interruption request receiving terminal IN(INT).

Next, words produced from host CPU are explained in detail.

Figure 5:
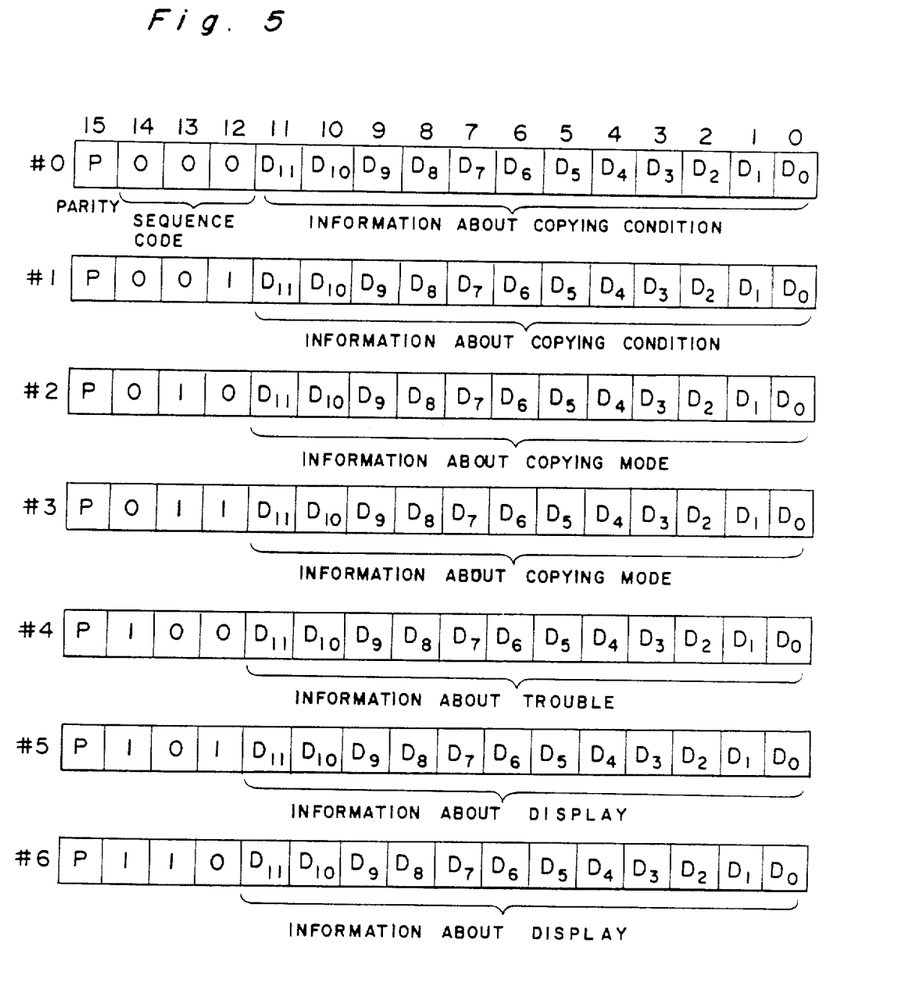
FIG. 5 is a diagrammatic view showing data blocks produced from a host microcomputer during one cycle of operation.

The host CPU 10 is previously programmed to sequentially produce from the arithmetic-logic unit ALU seven different 16-bit long data blocks #0 to #6, as shown in FIG. 5. The most significant bit of each data block is a parity bit for checking data error. The next 3 most significant bits are for a sequence code representing a R/S slave CPU. According to the embodiment, the sequence code changes as follows, "000", "001", "010", "011", "100", "101" and "110". The purpose of employing the sequence code will be described later.

The remaining 12 bits of the data block, indicated as $D_{11}$ to $D_0$, are for the specific data for controlling the copying machine. For example, a bit $D_{11}$ of the data block #0 carries "YES" or "NO" data whether the printing device is in a condition ready to start a new printing operation. A next bit $D_{10}$ of the data block #0 carries "YES" or "NO" data whether the sorter device is in a condition ready to sort copied papers. The remaining 10 bits $D_9$-$D_0$ may be used altogether to indicate a rate of enlargement or reduction.

Furthermore, a bit $D_{11}$ of the data block #1 carries "YES" or "NO" data whether the copy paper supply has started or not. A bit $D_{12}$ of the data block #1 carries "YES" or "NO" whether the exposure of the original document has been completed or not. A bit $D_{13}$ of the data block #1 carries "YES" or "NO" data whether the copies paper has been expelled or not.

Likewise, bits $D_{11}$-$D_0$ in data blocks #0 and #1 carry information about copying condition.

In the next data blocks #2 and #3, information about copying mode is carried. For example, bits $D_{11}$-$D_8$ of the data block #2 carry information of paper supplying tray, e.g., whether a copy paper should be supplied from an upper tray, middle tray or bottom tray. Bits $D_3$-$D_0$ of the data block #2 carry information of paper size.

In the next data block #4, information about trouble is carried. For example, bits $D_{11}$-$D_7$ of data block #4 carry information of type of trouble that has happened in the copying machine. A bit $D_6$ of data block #4 carries "YES" or "NO" information as to whether copy paper should be expelled without completing a full copying operation.

In the next data blocks #5 and #6, information about the display is carried. For example, bits $D_{11}$-$D_8$ of data block #5 carry numeral information deposited by ten key buttons. Bits $D_{11}$-$D_8$ of data block #6 carry information of the function selected by function key buttons.

Next, the operation of the data transmission system according to the present invention is described. First, an operation for transmitting data blocks #0 to #6 from the host CPU to each of R/S slave CPUs and R slave CPUs (generally referred to as slave CPUs) is described.

Figure 4:
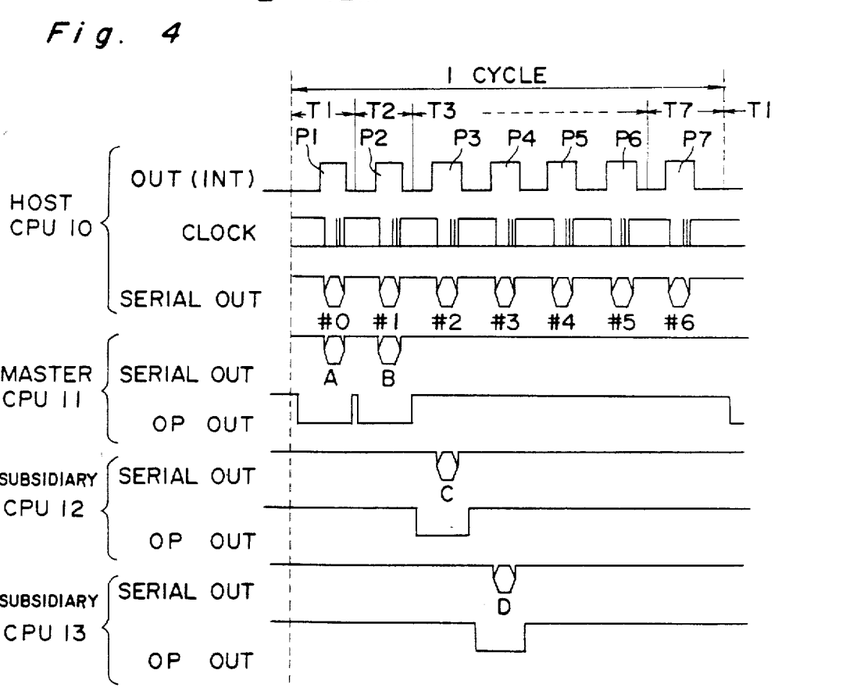
FIG. 4 is a chart showing waveforms produced from CPUs of host and slave microcomputers.

The host CPU 10 produces from its interrupt request producing terminal OUT(INT) interrupt request pulses P1, P2, P3, P4, P5, P6 and P7, as shown in FIG. 4. These pulses P1-P7 are applied to interrupt request receiving terminal IN(INT) of each of the slave CPUs 11-14 and 17 and 18. During each pulse period of the pulses P1-P7, more than 16 clock pulses are transmitted from the pulse generator PG to each shift registers through respective clock terminal CL. The shift register SR in the host CPU receives clock pulses directly from the pulse generator PG. Before the first interrupt request pulse P1 occurs, the shift register SR in the host CPU 10 is loaded with data block #0. Thus, in response to the first clock pulse from the leading edge of the first interrupt request P1, the first bit of the data block #0, i.e., parity bit, is sent out from the serial-out terminal SER OUT of the host CPU 10, and is taken into the shift register of each slave CPU. Then, in response to the second clock pulse, the second bit is sent out from the host CPU and is taken into each slave CPU. In this manner, the data block #0 in the shift register SR of host CPU is transferred to the shift register in each slave CPU before the end of the first interrupt request pulse P1.

Then, in a pulse interval between pulses P1 and P2, preferably before the end of a first sequence period T1, the data block #0 in the shift register SR of each slave CPU is transferred to the respective arithmetic-logic unit ALU, in which only the necessary data are utilized of the data $D_{11}$-$D_0$ in data block #0. In the same pulse interval, whatever data stored in the shift register SR of host CPU 10 (which will be described in detail later) is transferred to the arithmetic-logic unit ALU of the host CPU 10 for the system control.

Then, before the second pulse P2 occurs, preferably between the start of a second sequence period T2 and the leading edge of the second pulse P2, the host CPU 10 places the data block #1 in its shift register SR. Then, during the second pulse period P2, the data block #1 is transferred to the shift register in each slave CPU. And in a pulse interval between pulses P2 and P3, data block #1 is taken into the respective arithmetic-logic unit ALU, and whatever data stored in the shift register SR of host CPU 10 is taken into the arithmetic-logic unit ALU of the host CPU 10.

In this manner, the data blocks #0–#6 can be transferred to the arithmetic-logic unit ALU of each slave CPU before the end of a sequence period T7.

Next, an operation for transmitting data from a selected R/S slave CPU to host CPU is described.

As has been described above, all the R/S slave CPUs receive data block #0 at the same time, and in the next sequence they receive data block #1 at the same time. In this manner, all the R/S slave CPUs receive data blocks #0–#6 sequentially and in a repeated manner. Therefore, each R/S slave CPU can predict what number of data block comes next. For example, when the R/S slave CPU is receiving a data block #0, it is understood that the R/S slave CPU will receive a data block #1 in the following sequence.

Each R/S slave CPU is designated with at least one name code. For example, according to the embodiment described above, R/S slave CPU 11 is designated with two name codes "000" and "001". And, each of R/S slave CPUs 12, 13 and 14 is designated with one name code, "010" for CPU 12, "011" for CPU 13, and "100" for CPU 14.

When a data block #6 with a sequence code "110" is produced from the host CPU 10, all the slave CPUs receive sequence code "110" in addition to the specific data in the bits $D_{11}$–$D_0$. Each R/S slave CPU detects the sequence code "110" and calculates and finds what data block will be delivered in the next sequence. For example, in the above case, each R/S slave CPU finds that the next data block will be data block #0 with a sequence code "000". Then, each R/S slave CPU compares the sequence code "000" of the next data block #0 with its name code, and decides whether these two codes match with each other or not. If these two codes match in one R/S slave CPU, that R/S slave CPU will know that the next sequence is its turn to send data from that R/S slave CPU to host CPU and, therefore, that R/S slave CPU deposits its data to be sent in its shift register SR, and produces from the output OP an enable signal to the ENABLE terminal of gate 15 coupled to that R/S slave CPU, making it ready for sending.

Figure 6:
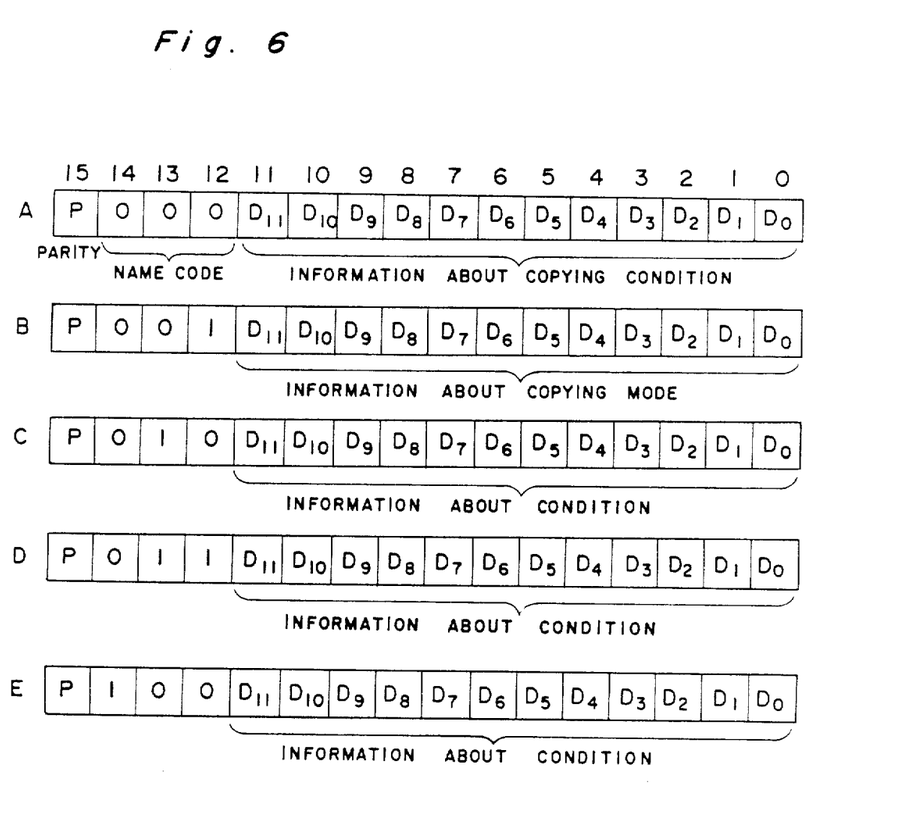
FIG. 6 is a block diagram showing data blocks produced from a R/S slave microcomputer.

For example, in the above given case, upon receipt of the data block #6, R/S slave CPU 11 with name codes "000" and "001" finds that it is its turn to send data to host CPU 10. Accordingly, immediately after the R/S slave CPU 11 reads in the data block #6, e.g., at a moment between the beginning of the sequence period T1 and the leading edge of the pulse P1, R/S slave CPU 11 starts to produce an enable signal from its output OP and, about the same time, it deposits in its shift register SR a data block A, such as shown in FIG. 6, first row.

It is to be noted that the data block A and other data blocks B–E to be sent from the R/S slave CPU to the host CPU are 16-bit long data and have the same structure as the data blocks #0–#6. The difference is the information contained in the bits $D_{11}$–$D_0$.

Then, in the next sequence, e.g., when the pulse P1 is present (FIG. 4), the data block #0 is transferred from the host CPU to each of the slave CPUs and, at the same time, a data block A is transferred from the R/S slave CPU 11 to host CPU 10. The mutual transmission of data between the host CPU and R/S slave CPU is carried out as follows.

When the first bit, i.e., a parity bit P, of the data block #0 in the shift register SR is sent from the host CPU to R/S slave CPU 11, the first bit, which is also a parity bit P, of the data block A in the shift register SR is sent from slave CPU 11 to the host CPU. For this purpose, the R/S slave CPU 11 should have a buffer register. In this manner, within the pulse period P1, 16-bit long data blocks #0 and A are exchanged bit-by-bit between the host CPU and R/S slave CPU 11.

During the pulse period P1, the above data exchange is carried out between the host CPU and R/S slave CPU 11, and at the same time, the data block #0 is transferred from the host CPU to all the other slave CPUs. Since the next data block #1 to be transferred has a sequence code "001", the same R/S slave CPU 11 having the name codes "000" and "001" finds that it is again its turn to send the data to the host CPU. Thus, at a moment between the beginning of the sequence period T2 and the leading edge of the pulse P2, R/S slave CPU 11 starts to produce an enable signal from its output OP and, about the same time, it deposits in its shift register SR a data block B, such as shown in FIG. 6, second row.

Then, during the pulse period P2, R/S slave CPU 11 serially produces the data block B and, at the same time, serially receives the data block #1 from the host CPU.

Also during the pulse period P2, all the other R/S slave CPUs serially receive the data block #1 having a sequential code "001" and, therefore, the R/S slave CPU 12 finds that the next sequence is its turn to send data to the host CPU. Thus, at a moment between the beginning of the sequence period T3 and the leading edge of pulse P3, R/S slave CPU 12 starts to produce an enable signal from its output OP and, about the same time, it deposits in its shift register SR a data block C, such as shown in FIG. 6, third row.

Then, during the pulse period P3, R/S slave CPU 12 serially produces the data block C and, at the same time, serially receives the data block #2 from the host CPU.

In this manner, R/S slave CPU 13 serially sends its data to the host CPU during the pulse period P4, and R/S slave CPU 14 serially sends its data to the host CPU during the pulse period P5.

According to one example, bits $D_{11}$–$D_0$ in data blocks A and B carry information which can be obtained from the R/S slave CPU 11, such as information about a copying condition.

In the next data block C, information which can be obtained from the R/S slave CPU 12, such as information about a machine condition is carried. Similarly, in the next data block D, information which can be obtained from the R/S slave CPU is carried. And, in the next data block E, information which can be obtained from the R/S slave CPU 14 is carried.

According to the present arrangement as best shown in FIG. 2, since there are only four R/S slave CPUs 11–14, with R/S slave CPU 11 occupying sequence periods T1 and T2 for sending data to the host CPU, and R/S slave CPUs 12, 13 and 14 occupying sequence periods T3, T4 and T5, respectively, sequence periods T6 and T7 can be used for additional R/S slave CPUs 16a and 16b, which are option CPUs to be employed in the future for controlling optional devices which may be added to the copying machine in the future for upgrading the copying machine.

When such additional R/S slave CPUs 16a and 16b are added, R/S slave CPU 16a is given a sequence perriod T6 for sending data to host CPU, and R/S slave CPU 16b is given a sequence period T7 for the same purpose.

In the embodiment described above, there are seven data blocks #0-#6 produced in one cycle from the host CPU, but any other number, such as more than seven data blocks can be produced in one cycle. In this case, more additional R/S slave CPUs would then be available for the future use.

As apparent from the foregoing description, the data transmission system according to the present invention can be assembled with only one data bus structure extending from the host CPU, and there is no need to provide any other lines, such as addressing lines, request lines or response lines between the host CPU and slave CPU. Therefore, the connection between the host CPU and slave CPUs can be accomplished without any difficulty.

Furthermore, since it is possible to present sequence periods unoccupied by the R/S slave CPUs for sending back the data, new R/S slave CPUs, the number of which is equal to the number of unoccupied sequence periods, can be added by a connection merely to the bus structure. And yet such new R/S slave CPUs will have their own sequence periods for sending data back to the host CPU.

Moreover, according to the present invention, it is possible to add, in future future, any the number of R slave CPUs, regardless of number of sequence periods in one cycle. In the case of copying machine, the R slave CPUs may be added for optional devices, such as: (1) a CRT display device for displaying the copying condition and paper transferring condition; (2) a copying fee calculation and display device for calculating the copying fee in accordance with the size of copy paper and the number of copies made, and for displaying the calculated fee; (3) a monitoring device connected to a plurality of copying machines installed at different divisions for monitoring the size and number of copies made in each division; and (4) a trouble monitoring device for monitoring any jam troubles that may occur and for recording the number of times and the conditions of such jam troubles.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of appended claims.

What is claimed is:

1. A data transmission system comprising:
   a host CPU having an output terminal means for repeatedly producing first data in a predetermined sequence, and an input terminal means for receiving second data, wherein said first data comprises a predetermined number of data blocks produced in a predetermined sequence in a repeated manner, each data block including a sequence code, which is different from those in other data blocks, for identifying each data block and specific data;
   a bus structure having at least one first-type of line extending from said output terminal means of said host CPU for transmitting said first data, and at least one second-type of line extending from said input terminal means of said host CPU for receiving said second data;
   a plurality of slave CPU's, each having at least one name code which corresponds to one of the sequence codes, each having an input terminal means connected to said first-type line of said bus structure for receiving said first data, and an output terminal means connected to said second-type line of said bus structure for sending said second data from said slave CPU;
   means, in each slave CPU, for receiving the first data;
   means, in each slave CPU, for detecting said sequence code defined in said first data;
   means, in each slave CPU, for operating upon the data in the data block when the detecting means detects that the data block includes the sequence code that corresponds to the name code of the slave CPU;
   means, in each slave CPU, for enabling said slave CPU to transmit data to said host CPU when said sequence code as detected by said detecting means indicates that, during the next successive data block, data is to be transmitted from said slave CPU to said host CPU at a predetermined sequence, that has been allotted to said slave CPU, and
   means for sending data from said slave CPU to said host CPU during the next sequence of transmitting data from said host CPU to all of the slave CPU's.

2. A data transmission system as claimed in claim 1, wherein said output terminal means of said host CPU comprises one terminal through which said data block is sent as a bit-by-bit serial data block, and wherein said input terminal means of each slave CPU comprises one terminal through which said serial data block is received bit-by-bit.

3. A data transmission system as claimed in claim 1, wherein said output terminal means of each slave CPU comprises one terminal through which said second data is sent as bit-by-bit serial data, and wherein said input terminal means of each host CPU comprises one terminal through which said serial second data is received bit-by-bit.

4. A data transmission system as claimed in claim 1, wherein said host CPU further has an interruption signal producing terminal for producing an interruption signal, said bus structure further having a third-type of line extending from said interruption signal producing terminal, and each slave CPU further having an interruption signal receiving terminal connected to said third-type of line for receiving said interruption signal, whereby the transmission of said first and second data is carried out during the presence of said interruption signal.

5. A data transmission system as claimed in claim 1, wherein said host CPU further has a clock pulse producing terminal for producing clock pulses, said bus structure further having a fourth-type of line extending from said clock pulse producing terminal, and each slave CPU further having a clock pulse receiving terminal connected to said fourth-type of line for receiving said clock pulses, whereby the transmission procedure is synchronized between said host CPU and each slave CPU.

6. The invention of claim 1 wherein the detecting means, in each slave CPU includes a shift register enabled to receive the data blocks of said first data.

7. In a computer controlled copying system for reproducing copies of indicia from originals having a master CPU and a plurality of slave CPU's responsive to the master CPU for monitoring and/or controlling certain copying functions, the improvement comprising:

means for providing a clock terminal, a serial-in terminal and a serial-out terminal on the master CPU;

means for providing a clock terminal and a serial-in terminal on all of the slave CPU's;

means for providing a serial-out terminal on some of the slave CPU's;

a common data bus extending between the master CPU and each of the slave CPU's, including a plurality of communication lines, a respective communication line connected to a terminal on the master CPU and to each of the appropriate terminals provided on the slave CPU's;

means for generating timing pulses for transmission from the clock terminal of the master CPU to the clock terminals of the slave CPU's to synchronize their respective operations;

means, in the master CPU, for forming and serially transmitting at a predetermined frequency, through the serial-out terminal of the master CPU, data blocks, each data block including a sequence code that identifies the type of data information carried by that data block;

means, in each slave CPU, for receiving each data block through its serial-in terminal including the sequence code and for determining if that data block should be processed by the slave CPU, and means, in those slave CPU's having a serial out terminal, for enabling, from evaluation of the sequence code, that slave CPU to transmit data to the master CPU in proper sequence, wherein the means for enabling includes a predetermined code stored in each slave CPU, means for calculating the next sequence code in order from the received sequence code and means for matching the calculated code with the predetermined code for that slave CPU, for determining the next data block to be transmitted by the master CPU, the enabling means permitting the slave CPU to transmit data to the master CPU during the sending of the next data block.

8. A computer controlled copying system as claimed in claim 7, further including an interruption signal means for producing an interrupt signal wherein an interrupt request terminal means on the master CPU and an interrupt request terminal on all slave CPUs are operatively connected through the common data bus whereby the transmission of data blocks from the master CPU to the slave CPUs and the transmission of data to the master CPU from those CPUs having a serial out terminal is carried out during the presence of the interrupt signal.

9. In a computer controlled copying system for reproducing copies of indicia from originals having a master CPU and a plurality of slave CPU's responsive to the master CPU for monitoring and/or controlling certain copying functions, at least some of the slave CPU's have a data transmitting capability, the improvement comprising:

a common data bus extending between the master CPU and each of the slave CPU's;

means, in the master CPU, for forming and serially transmitting at a predetermined frequency data blocks on the data bus, each data block including a sequence code that identifies the type of data information carried by that data block;

means, in each slave CPU, for receiving each data block from the data bus, including the sequence code and for determining if that data block should be processed by the slave CPU, and means, in those slave CPU's having a data transmitting capability, for enabling, from evaluation of the sequence code, the slave CPU to transmit data to the master CPU in proper sequence, wherein the means for enabling includes a predetermined code stored in the slave CPU, means for calculating the next sequence code in order from the received sequence code and means for matching the calculated code with the predetermined code for the slave CPU for determining the next data block to be transmitted by the master CPU, the enabling means permitting the slave CPU to transmit data to the master CPU during the sending of the next data block.

* * * * *